UNITED STATES PATENT OFFICE.

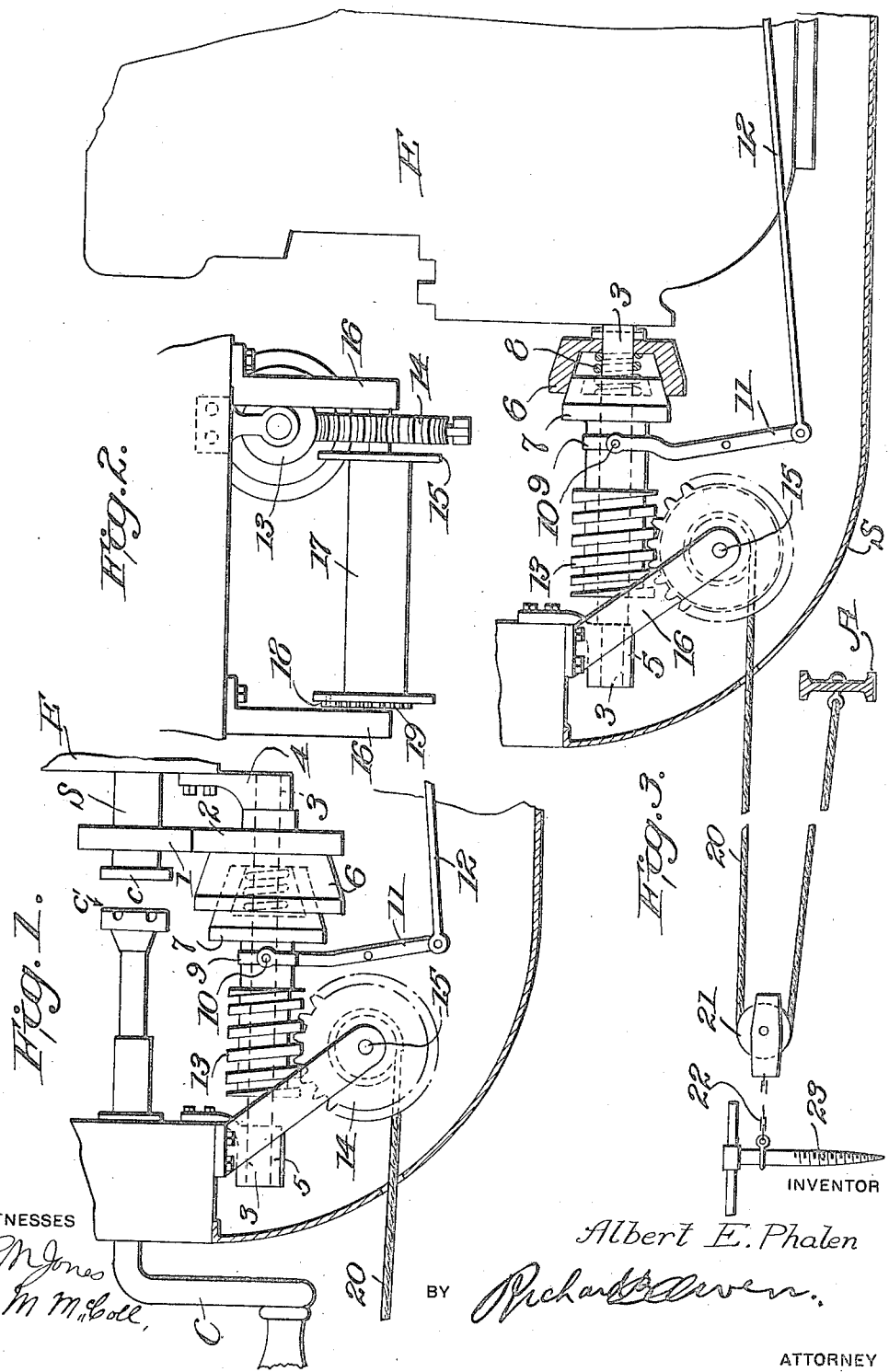

ALBERT E. PHALEN, OF SANDUSKY, WISCONSIN.

AUTOMOBILE-PULLING ATTACHMENT.

1,253,524.  Specification of Letters Patent.  Patented Jan. 15, 1918.

Application filed June 9, 1917. Serial No. 173,815.

*To all whom it may concern:*

Be it known that I, ALBERT E. PHALEN, a citizen of the United States, residing at Sandusky, in the county of Sauk and State of Wisconsin, have invented certain new and useful Improvements in Automobile-Pulling Attachments, of which the following is a specification.

This invention relates to motor vehicles, and more particularly to automobile extractors or pulling devices, whereby an automobile is enabled to extract itself from a mire or stalled position by the power of its own engine.

The primary object of the invention is to provide a simple and efficient attachment of this character which may be readily applied to various makes of motor vehicles, and in which the engine of the vehicle is used to provide the power for pulling it out of a hole or in any place when the wheels will not take hold.

Another object is to provide a simple and efficient device of this character which when attached to an automobile forms a permanent part thereof, and which can be quickly and easily thrown into and out of the operative position for action by the engine shaft.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:

Figure 1 represents a fragmentary side view of an automobile with the mechanism constituting this invention, shown applied and in inoperative position.

Fig. 2 is a front view thereof.

Fig. 3 is a view similar to Fig. 1 showing the application of the invention to a slightly different form of automobile.

In the embodiment illustrated, the motor engine is indicated by E, provided with the usual turning shaft S projecting beyond the front end thereof and which is equipped with the usual clutch member $c$ adapted to be engaged by a coöperating clutch member $c'$, connected with the crank C, and which is usually employed for starting an engine of this character.

The shaft S is shown provided with a gear 1, fixed thereto which meshes with a gear 2, loosely mounted on a countershaft 3. This countershaft 3 is shown in Fig. 1 supported in depending brackets 4 and 5, carried by the frame of the machine.

A friction clutch member 6 is fixed to the front face of the gear 2 and is preferably made cup-shaped with flared side walls as is shown clearly in Figs. 1 and 3. A coöperating clutch member 7 is keyed on shaft 3 and is shown truncated cone-shaped in form to fit within and frictionally engage the clutch member 6. A coiled expansion spring 8 encircles shaft 3 and is positioned between the clutch members 6 and 7 and exerts its tension to normally force said members out of engagement with each other. The clutch member 7 is provided with the usual grooved collar 9 in which is mounted the end 10 of an operating lever 11 fulcrumed intermediately of its ends on the machine frame. An operating rod 12 is connected with the free end of said lever 11 and extends to a point for convenient operation by the driver, it being understood that when this rod 12 is moved forwardly, the lever 11 will be actuated to force the clutch member 7 into operative engagement with the clutch member 6, and thereby connect shaft 3 with the engine shaft S through the intermeshing gears 1 and 2.

A worm 13 is also fixed to the countershaft 3 and meshes with a worm gear 14, carried by a shaft 15 arranged in a plane at right angles to the countershaft 3, and which is mounted to rotate in depending hangers 16, carried by the vehicle frame. A drum 17 is mounted to turn freely on the shaft 15 between said hangers, and is provided at one end with a pawl 18 which engages a ratchet wheel 19, fixed to shaft 15, and by means of which said drum is connected with the shaft to be turned on the rotation thereof. It is to be understood, that when the pawl 18 is disengaged from the ratchet 19, said drum 18 may be turned freely on the shaft for a purpose to be described.

A cable 20 is fixed at one end to the drum 17 and is designed to be wound upon said drum, when the device is not in use, the free end being secured in any desired and suitable manner to prevent unwinding.

When it is desired to use this pulling attachment when the vehicle to which it is applied becomes stalled for any reason, the pawl 18 is disengaged from ratchet 19, and the cable 20 may be then freely unwound from drum 17 and its free end attached to any suitable support, a tree, a fence post or the like being ordinarily employed, but a pulley attachment, shown at 21 is preferably carried in the vehicle for use when desired and which has a chain 22 designed to be engaged with a stake 23 to be driven in the ground and the cable 20 may then be passed around the pulley and engaged at its free end with the axle A of the vehicle. The engine being in operation, the operator forces the rod 12 forward thereby causing the clutch member 7 to engage the clutch member 6, and thus connect shaft 3 with the engine shaft 8 for rotation thereby, and these members are held in engaged position as soon as the cable is placed under tension. Rotation of shaft 3 operates through the worm 13 to turn the worm gear 14, and thereby rotates shaft 15, turning with it the drum 17 and slowly winding up the cable 20 thereon, the result being that the machine is pulled from its mired position and advanced toward the point where the free end of the cable has been anchored. This operation may be repeated and continued until the wheels of the automobile rest on solid ground after which the machine may be operated under its own power. It will be obvious that while there is any pull on the cable the clutch cannot release until a slack is produced in the cable which is accomplished by putting the traction wheels of the car in operation when spring 8 will release the clutch.

The form shown in Fig. 3 is exactly like that shown in Figs. 1 and 2 except that the shaft 3 instead of being arranged parallel with the engine shaft is positioned in longitudinal alinement therewith, and is designed to be connected thereto by a clutch (not shown).

From the foregoing description, taken in connection with the accompanying drawing, the advantages of the construction and of the method of operation will be readily apparent to those skilled in the art to which the invention appertains and while I have described the principle of operation of the invention, together with the device which I now consider to be the best embodiment thereof, I desire to have it understood that the device shown is merely illustrative and that such changes may be made as are within the scope of the claimed invention.

I claim:

1. The combination with the frame and engine of a motor vehicle, of a rotatable drum, a cable wound thereon, a shaft on which said drum is mounted, a worm gear fixed to said shaft, a shaft rotatably mounted in a plane at right angles to said drum shaft, a worm fixed thereto and meshing with the worm gear on said drum shaft for transmitting motion to said drum shaft, a connection between said worm shaft and the shaft of the engine, means under the control of the operator for connecting said worm and engine shaft, and means for automatically releasing said shafts when a slack is produced in the cable.

2. The combination with the frame and engine of a motor vehicle, a gear fixed to the shaft of the engine, a counter-shaft mounted for rotation on said frame, a gear carried loosely by said counter-shaft and meshing with the gear on said engine shaft, a clutch member fixed to said loose gear, a coöperating clutch member mounted to slide on said counter-shaft, means for engaging said clutch members to connect said shafts, a coil spring arranged between said members to force them normally apart, a shaft mounted to rotate in a plane at right angles to said counter-shaft and connected to be operated thereby, a drum loosely mounted on said shaft, means for detachably connecting said drum and shaft, whereby motion is imparted to the drum from the shaft, and a cable carried by said drum.

In testimony whereof I affix my signature in presence of two witnesses.

ALBERT E. PHALEN.

Witnesses:
 JOE O'MALLEY,
 EMMETT PHALEN.